No. 796,873. PATENTED AUG. 8, 1905.
F. A. SEIBERLING.
VEHICLE WHEEL.
APPLICATION FILED DEC. 30, 1904.

2 SHEETS—SHEET 1.

Witnesses.
Robert Everitt.
James L. Norris, Jr.

Inventor.
Frank A. Seiberling.
By James L. Norris.
Atty.

No. 796,873. PATENTED AUG. 8, 1905.
F. A. SEIBERLING.
VEHICLE WHEEL.
APPLICATION FILED DEC. 30, 1904.
2 SHEETS—SHEET 2.
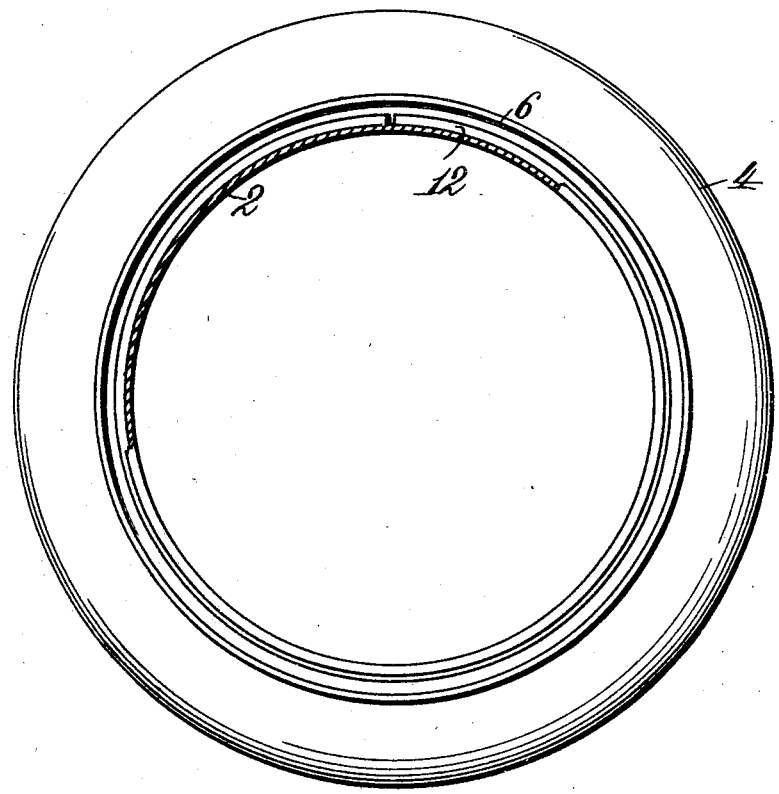
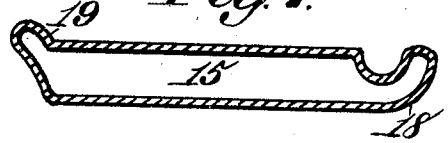
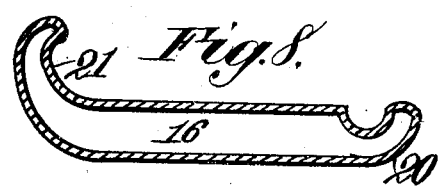
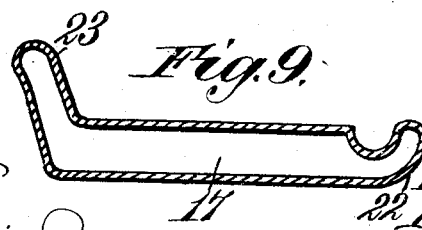
Witnesses.
Robert Everitt,
James L. Norris,
Inventor.
Frank A. Seiberling,
By James L. Norris,
Atty.

UNITED STATES PATENT OFFICE.

FRANK A. SEIBERLING, OF AKRON, OHIO.

VEHICLE-WHEEL.

No. 796,873.  Specification of Letters Patent.  Patented Aug. 8, 1905.

Application filed December 30, 1904. Serial No. 238,964.

*To all whom it may concern:*

Be it known that I, FRANK A. SEIBERLING, a citizen of the United States, residing at Akron, in the county of Summit and State of Ohio, have invented new and useful Improvements in Vehicle-Wheels, of which the following is a specification.

This invention relates to vehicle-wheels provided with pneumatic, solid, or cushion tires of elastic material, more particularly pneumatic tires of the double-tube type having contractible, inextensible, or semi-inextensible bands or edges; and the object thereof is to so construct the wheel as to enable the tire to be very quickly applied or removed when necessary.

The invention further aims to provide a wheel of the class referred to with a new and improved holdfast means for the tire hereinafter more specifically described, said means fixedly securing the tire in position, so that the tire will not be displaced in any manner, and said means being removable as well as reversible to enable its use in connection with tires of various constructions.

The invention further aims to provide a vehicle-wheel of the class referred to with a new and improved rim hereinafter more specifically described, said rim coöperating with the holdfast means for the tire, said rim and means being simple in construction, strong, durable, efficient in use, comparatively inexpensive to manufacture, readily applied to ordinary forms of wooden-fellied wheels or those using metal spokes, and enables a tire to be readily secured or removed when occasion requires.

With the foregoing and other objects in view the invention consists of the novel construction, combination, and arrangement of parts constituting the wheel to be hereinafter referred to, and illustrated in the accompanying drawings, which form a part of this specification, in which is shown the preferred embodiment of the invention; but it is to be understood that changes, variations, and modifications can be resorted to which come within the scope of the claims hereunto appended.

Figure 1:
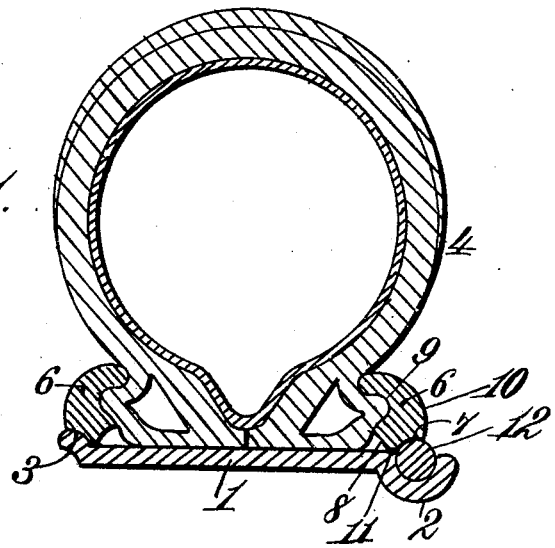
Figure 2:
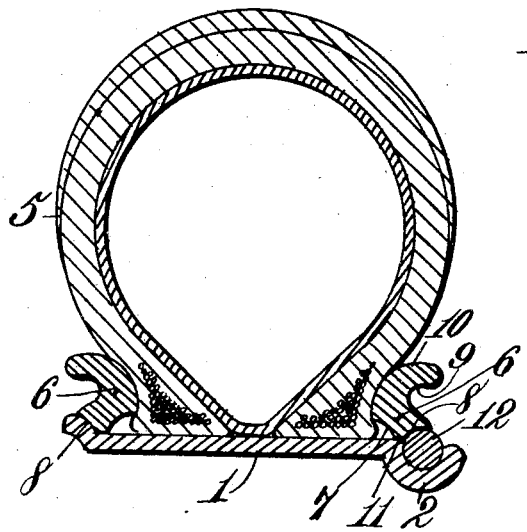
Figure 3:
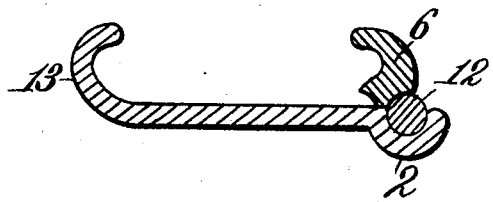
Figure 4:
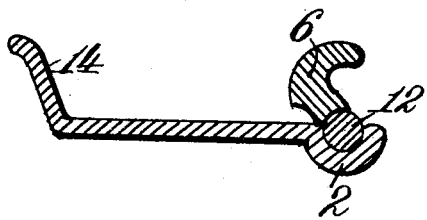

In the drawings, wherein like reference characters denote corresponding parts throughout the several views, Figure 1 is a cross-section of a rim and tire portion of a wheel constructed in accordance with this invention, also showing in section the holdfast means for securing the tire, said holdfast means arranged in operative relation with respect to that form of tire known as the "clencher" type. Fig. 2 is a like view showing the arrangement of the holdfast means in operative relation with respect to another form of tire. Fig. 3 is a like view of a modified form of wheel-rim of the character known in the art as a "clencher" type. Fig. 4 is another modified form of a rim. Fig. 5 is a side elevation of a wheel broken away, showing the holdfast means in position. Fig. 6 is a modified form of one of the retaining devices. Figs. 7, 8, and 9 are sectional views of a modified form of rim, showing the application of the invention for use in connection with a wire, metal, or tubular spoke wheel.

Referring to Figs. 1 and 2 of the drawings, 1 denotes a flat rim having one side formed with an endless offset 2, semicylindrical in cross-section and forming a seat for the purpose hereinafter set forth. Said offset 2 is on the level or depends below the plane of the inner face of the rim. The other side of the rim 1 is formed with an upwardly-extending endless inclined curved flange 3, forming an abutment for the purpose hereinafter set forth.

The holdfast means for the tire, whether it be used for the form of tire shown in Fig. 1, which is indicated by the reference character 4, or whether it be used for the form of tire shown in Fig. 2, which is indicated by the reference character 5, consists of a pair of endless tire-retaining devices or rings and a split locking device. The retaining devices will now be referred to. Each of the retaining devices is removable as well as reversible, and these said devices are also interchangeable. When the said devices are in one position, they act as tire-holders, and in the other position they act as clamps. The retaining devices are indicated by the reference character 6, and are in the form of endless rings. Each of said devices is formed with the bearing-surfaces 7, 8, 9, and 10, which are preferably curved, and said devices are also provided with a flat bearing-surface 11. The constructing of the retaining devices with the bearing-surfaces 7, 8, and 9 forms the said devices with recesses, one of which is adapted to receive and clench a portion of the tire at the base thereof and the others of which are adapted to receive a portion of the locking device. The flat bearing-surface 11 can be dispensed with and each of the devices constructed as shown in Fig. 6. The function of the bearing-surfaces 7, 8, 9, and 10, as well as the flat bearing-surface 11, will be hereinafter referred to. The locking device consists of a split ring and is indicated by the reference character 12 and may be of various forms, preferably cylindrical in cross-section; but one or two of the bearing-surfaces of each of the retaining devices should conform to the shape of the ring.

In assembling a wheel for use in connection with the tire 4 the bearing-surface 7 of one of the retaining devices 6 bears against the flange 3, and the bearing-surface 7 of the other retaining device bears against the ring 12, which is mounted within the offset 2. The flat bearing-surfaces of the retaining devices rest upon the upper face of the rim in close proximity to the flange 3 and offset 2. The curved bearing-surfaces 9 clench the base portion of the tire 4. When the tire is inflated, the pressure is against the curved surfaces 9 of the retaining devices, which causes the devices to securely retain themselves upon the flange 3 and the ring 12. At the same time the retaining device, which is arranged in operative relation with respect to the ring 12, is securely locked by said ring in position. It will be stated that the retaining devices are set up in operative position before the ring 12 is seated in the offset. After the retaining devices are in position the ring is sprung into the offset or its seat, consequently forming what is termed the "locking device" for the tire-retaining devices.

Although the locking device is intended to keep the retaining device from slipping off the rim, (that retaining device which is engaged by the locking device,) the retaining device itself automatically locks the locking device in its seat when the tire is being inflated or after the tire is inflated. By such an arrangement the locking device cannot be taken out of its seat without first deflating the tire and then moving the endless retaining device toward the center of the rim, when the locking device can be quickly detached by springing it out of its seat.

When setting up a wheel when a tire of the form shown in Fig. 2 is employed, the retaining devices are reversed, and the bearing-surfaces 8 of said retaining devices bear, respectively, against the flange 3 and ring 12, and the base of the tire bears against the surfaces 10. The action of the retaining devices in this arrangement secures or holds the tire upon the rim, and the action of the locking device is the same as that heretofore referred to.

In Fig. 3 a modified form of rim is shown, and in this construction the rim at one side terminates in a clenching member, which is indicated by the reference character 13. The other side of the rim is of the same construction as the rim shown in Figs. 1 and 2, the same reference characters being applied thereto. In the structure shown in Fig. 3 but one retaining device is employed. This retaining device is of the same construction as any one of the retaining devices shown in Figs. 1 and 2, except that surface 7 can be omitted, the same reference characters being applied thereto. The locking device employed in the structure shown in Fig. 3 is the same as that shown in Figs. 1 and 2, the same reference characters being applied thereto.

In the construction shown in Fig. 4 a modified form of rim is shown. This rim is the same as that shown in Fig. 3, with the exception that one side of the rim terminates in an abutment, this abutment being indicated by the reference character 14. Otherwise than that as stated the construction of Fig. 4 is the same as that shown in Fig. 3, except that surface 7 can be omitted—that is to say, but a single retaining device is employed and also a locking device, as shown in Figs. 1 and 2.

In Fig. 6 the retaining device illustrated has the bearing-surface 11 dispensed with. Otherwise than that as stated the construction of the retaining device is the same as that shown in Figs. 1 and 2, the same reference characters being applied thereto.

In the modified forms of rim shown in Figs. 7, 8, and 9 is shown the adaptation of the invention as applied to a wire, metal, or a tubular spoke wheel. The rim in Fig. 7 is designated by the reference character 15, in Fig. 8 by the reference character 16, and in Fig. 9 by the reference character 17. The rims shown in Figs. 7, 8, and 9 are what may be termed "tubular" rims. The rim 15 is provided with an offset 18 and a flange 19, the offset 18 and flange 19 being the equivalent of the offset 3 and flange 2 shown in Figs. 1 and 2. The rim 16 is formed with an offset 20 similar to the offset 18 and also with a clenching member 21, which is the equivalent of the clenching member 13 shown in Fig. 3. The rim 17 is provided with an offset 22, which is similar to the offset 18, with an abutment 23 equivalent to the abutment 14 shown in Fig. 4.

Although the term "retaining devices" is used to designate the element 6, yet, as before stated, the said elements not only act as clamps, but also act as holders, and the term "holders" will be used in the claims to generically cover the function of holding and clamping the tire.

The devices shown in Figs. 3 to 9, both inclusive, are applicable to either a pneumatic, solid, or cushion tire of elastic material.

Having thus fully described my invention, what I claim as new, and desire to secure by Letters Patent, is—

1. A vehicle-wheel comprising a rim having a seat, a reversible endless tire-holding device mounted thereon, and a split locking device mounted in said seat and engaging said holding device for securing the latter in position.

2. In a vehicle-wheel, the combination with a rim and a tire-holder-locking device, of a tire-holder adapted to be engaged by said locking device, said tire-holder consisting of an endless ring provided with four curved bearing-surfaces, one of said curved bearing-surfaces conforming in contour to said locking device.

3. In a vehicle-wheel, the combination with a rim and a tire-holder-locking device, of a tire-holder adapted to be engaged by said locking device, said tire-holder consisting of an endless ring provided with four curved bearing-surfaces, two of said curved bearing-surfaces conforming in contour to said locking device.

4. In a vehicle-wheel, the combination with an imperforate rim and a tire-holder-locking device, of a tire-holder adapted to be engaged by said locking device, said tire-holder consisting of a ring provided with a plurality of bearing-surfaces, one of said surfaces conforming in contour to said locking device.

5. In a vehicle-wheel, the combination with an imperforate rim and a tire-holder-locking device, of a tire-holder adapted to be engaged by said locking device, said tire-holder consisting of a ring provided with a plurality of bearing-surfaces, one of said surfaces conforming in contour to said locking device and adapted to be engaged by said locking device.

6. In a vehicle-wheel, the combination with a rim and a tire-holder-locking device, of a tire-holder adapted to be engaged by said locking device, said tire-holder consisting of a ring provided with a plurality of bearing-surfaces, two of said surfaces conforming in contour to said locking device and adapted to be engaged by said locking device.

7. A vehicle-wheel comprising a rim having an abutment at one side and an offset at the other, said offset forming a seat, a reversible tire-holding means bearing against said abutment, a locking device mounted in said seat, and a reversible tire-holding means bearing against said locking device and retained in position by said locking device.

8. A vehicle-wheel comprising a rim having an abutment and an offset forming a seat, a locking device mounted in said seat, and a reversible tire-holding means bearing against said locking device and adapted to be retained in position thereby.

9. A vehicle-wheel comprising a rim having a seat, a reversible endless tire-holding device mounted thereon, and a locking device mounted in said seat and engaging said holding device for securing the latter in position.

10. In a vehicle-wheel, the combination with an imperforate rim and a tire-holder-locking device, of a tire-holder adapted to be engaged by said locking device, said tire-holder consisting of an endless ring provided with a plurality of bearing-surfaces, one of said bearing-surfaces conforming in contour to said locking device.

11. In a vehicle-wheel, the combination with a rim and a tire-holder-locking device, of a tire-holder adapted to be engaged by said locking device, said tire-holder consisting of an endless ring provided with a plurality of bearing-surfaces, two of said bearing-surfaces conforming in contour to said locking device.

12. A vehicle-wheel comprising the combination with a rim carrying a tire-locking element, of a reversible holding element carried by the rim and engaging said locking element, automatically locked by the inflation of the tire and retained in position by said locking element.

13. A vehicle-wheel comprising the combination with a rim carrying a reversible tire-holding element, of a detachable securing element carried by the rim, engaging said holding element, automatically locked by the inflation of the tire and retained in position by said holding element.

14. A vehicle-wheel comprising the combination of a rim carrying a reversible and endless tire-holding element, of a securing element carried by the rim, engaging said holding element, automatically locked by the inflation of the tire and retained in position by said holding element.

15. A vehicle-wheel comprising a rim having a seat, a removable, reversible and endless tire-holding device mounted thereon, and a detachable locking device mounted in said seat and engaging said holding device for securing the latter in position.

In testimony whereof I have hereunto set my hand in presence of two subscribing witnesses.

FRANK A. SEIBERLING.

Witnesses:
C. E. BINGHAM,
R. O. HAGENBAUGH.